F. P. IANNARONE.
EYE-GLASSES.

No. 191,149.  Patented May 22, 1877.

Witnesses:  Inventor.

UNITED STATES PATENT OFFICE.

FRANK P. IANNARONE, OF WASHINGTON, DISTRICT OF COLUMBIA.

IMPROVEMENT IN EYEGLASSES.

Specification forming part of Letters Patent No. 191,149, dated May 22, 1877; application filed December 6, 1876.

CASE B.

*To all whom it may concern:*

Be it known that I, F. P. IANNARONE, of Washington, in the District of Columbia, have invented certain new and useful Improvements in Eyeglasses; and I do hereby declare that the following is a full and exact description thereof, reference being had to the accompanying drawings, making a part of this specification.

My invention relates to certain improvements in frameless eyeglasses. It has for its object the connecting of the two glasses in such manner that the means of connection shall not in any manner interfere with the vision of a person wearing the same; and, with these ends and objects in view, my invention consists in connecting the glasses to the nose spring or frame by means of a clamp acting upon a recess or bearing formed upon the edge of either glass, as will be hereinafter more fully set forth.

Previous to my invention eyeglasses have been made without a frame; and, in order to properly and securely connect the two glasses to the nose-spring, a suitable connecting-piece of metal has been riveted or secured by a screw to the faces of the glasses, these pieces and their connecting devices lying upon the faces of the glasses, and, in order to secure strength, necessarily extending some considerable distance toward the center, obstructing the vision when a turning of the eye is made to look upon an object at an angle, and being a source of great annoyance to the wearer.

My invention is designed to overcome this disadvantage; and in order that my invention may be more readily understood, I will proceed to describe the same, referring by letters to the accompanying drawing, in which—

Figure 1:
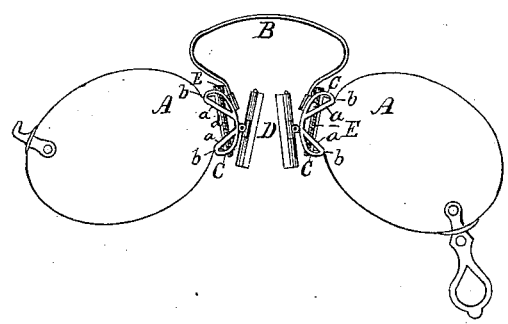
Figure 2:
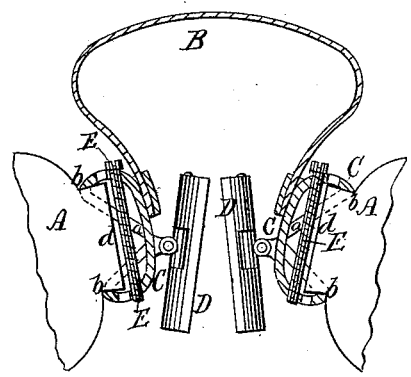

Figure 1 is a plan view of a pair of frameless glasses embodying the features of my invention, and Fig. 2 a vertical section of the same on an enlarged scale, with the glass portion partially broken away.

Similar letters of reference indicate like parts in both figures.

A A represent the ordinary elliptical glasses, and B the nose-spring, to which they are secured by an intermediate clamp, C, of flat metal, bent into a somewhat C shape, and braced on either side by fine braces, *a a*. The nose-spring may be secured to these clamps in the same manner that it is now secured to the frame surrounding the ordinary framed glasses. To the inside of the clamps C are attached double adjustable nose-clamps D, the special construction and operation of which form the subject-matter of another application by me for Letters Patent filed simultaneously with this, and to the description of which I refer for a clear understanding of the same.

E is a screw rod or rivet passing through the top and bottom curves of the C-clamp, to draw the same toward each other, and hold them in any given relation. The glasses A A are slightly recessed or dovetailed at their inner ends, as seen at *b*, and preferably cut or ground on a straight line at *d*, Fig. 2, to permit the passage of the screw E, although this is not absolutely necessary, as a curved line may avoid interference with the screw.

In order to secure the glasses to the clamps, the curved ends of the latter are laid or sprung into the recesses or dovetails formed in the former, and the tightening and securing screw E put in its place, and the ends of the clamp drawn thereby toward each other, and so as to grasp and hold the glasses by the edges thereof. A suitable slot may be formed in the curves of the clamp, to permit the end of the dovetail to project, if necessary. The clamps being secured to the glasses, the nose-spring and pads are next attached, and the several parts, forming a frameless pair of eyeglasses, are intact, and producing a much more strong, durable, and desirable article than is at present known.

What I claim as new, and desire to secure by Letters Patent, is—

1. The clamps C, adapted to be secured to the edges of the glasses A, substantially as and for the purposes hereinbefore set forth.

2. In combination with the securing-clamps

C, the glasses A, provided with two recesses in the edges thereof, on opposite sides of the horizontal diameter, and adapted to receive the ends of the clamps, substantially as and for the purpose hereinbefore set forth.

3. The glasses A, formed with a recess on either side of the horizontal diameter, substantially as and for the purpose described.

Witness my hand and seal this 1st day of December, A. D. 1876.

F. P. IANNARONE. [L. S.]

Witnesses:
FRANK PHILLIPS,
JNO. J. BONNER.